(12) United States Patent
Lyatkher

(10) Patent No.: US 8,047,785 B2
(45) Date of Patent: Nov. 1, 2011

(54) COUNTERBALANCED ORTHOGONAL HYDROPOWER SYSTEM

(76) Inventor: Victor Lyatkher, Richmond Hts, OH (US)

( * ) Notice: Subject to any disclaimer, the term of this patent is extended or adjusted under 35 U.S.C. 154(b) by 46 days.

(21) Appl. No.: 12/584,868

(22) Filed: Sep. 14, 2009

(65) Prior Publication Data

US 2010/0111696 A1    May 6, 2010

Related U.S. Application Data

(60) Provisional application No. 61/110,190, filed on Oct. 31, 2008.

(51) Int. Cl.
*F01D 5/02* (2006.01)
*F03B 3/12* (2006.01)
*F03B 13/10* (2006.01)

(52) U.S. Cl. .......................................... 416/85; 416/203

(58) Field of Classification Search .................. 290/43, 290/54; 15/4.1, 906; 416/17, 85, 110, 111, 416/153, 203; 415/4.1, 906
See application file for complete search history.

(56) References Cited

U.S. PATENT DOCUMENTS

| | | | | |
|---|---|---|---|---|
| 4,276,481 A * | 6/1981 | Parker | ............................ | 290/43 |
| 4,748,808 A * | 6/1988 | Hill | ............................... | 60/398 |
| 6,091,161 A * | 7/2000 | Dehlsen et al. | .................. | 290/43 |
| 6,097,104 A * | 8/2000 | Russell | ............................ | 290/54 |
| 6,172,429 B1 * | 1/2001 | Russell | ............................ | 290/54 |
| 6,710,469 B2 * | 3/2004 | McDavid, Jr. | ................... | 290/55 |
| 6,756,695 B2 * | 6/2004 | Hibbs et al. | ..................... | 290/42 |
| 6,800,955 B2 * | 10/2004 | McDavid, Jr. | ................... | 290/54 |
| 6,808,366 B2 * | 10/2004 | Sikes | ................................ | 416/1 |
| 7,034,499 B2 * | 4/2006 | Kerlin et al. | ................... | 318/749 |
| 7,235,893 B2 * | 6/2007 | Platt | ............................... | 290/54 |
| 7,358,623 B2 * | 4/2008 | Richards et al. | ................ | 290/55 |
| 7,770,390 B2 * | 8/2010 | Wegener et al. | ................ | 60/497 |

FOREIGN PATENT DOCUMENTS

| | | |
|---|---|---|
| RU | 2242634 | 12/2004 |
| RU | 2245456 | 1/2005 |

* cited by examiner

*Primary Examiner* — Edward Look
*Assistant Examiner* — Sean J Younger

(57) ABSTRACT

A counterbalanced orthogonal hydropower system for generating electricity comprises -an upper and lower turbines made as ring-shaped platforms, each incorporating a rotor, the turbines include hydro-dynamical blades positioned to rotate the turbines in opposite directions, -variously disposed inductors, -a tower mounted on a water reservoir's bottom, -a frame, supported by the tower and peripherally surrounded by a rigid polygon-shaped structure having vertexes, -units for rotatable support of the turbines associated with the frame, and -units for support of the inductors, wherein the latters are attached to the vertexes through spring-loaded hinges. It may also comprise units for support of the circular shape of platforms, for braking rotation of the turbines, for unloading the turbines from lateral forces, and for unloading the turbines from vertical forces. The top turbine may have negative buoyancy, while the bottom turbine and frame may have positive buoyancy. The frame can be made of hollow rods.

13 Claims, 5 Drawing Sheets

COUNTERBALANCED ORTHOGONAL HYDROPOWER SYSTEM

CROSS-REFERENCE TO RELATED APPLICATIONS

The present U.S. nonprovisional patent application claims the benefit of a provisional patent application No. 61/110,190 filed on Oct. 31, 2008, the disclosure of which is incorporated herein in its entirety by reference. The present patent application also contains new parts, which were not previously disclosed in the above-indicated provisional application.

FIELD OF THE INVENTION

The invention relates to the area of power generation, and in particular to tidal or hydro-power stations, which extract energy from flowing water and convert it into electrical power.

BACKGROUND OF THE INVENTION

There is known an axial hydro-electric generator taught in RU2242634, comprising a primary and a secondary parts, and a number of units for maintaining a clearance between the generator's parts, which units are made in the form of a roller and a sliding bearing. The interaction of the rollers with the parts is unloaded due to action of floating forces.

The aforementioned generator however has a maintenance problem caused by the interaction between the primary and secondary parts of thereof An orthogonal hydro-power device, described in a Russian Patent RU2245456 and Ukrainian Patent UA15209, provides a solution, wherein reactionary loadings are considerably reduced by ring-shaped platforms, rotating in opposite directions, which device is the nearest related art to the present invention.

However, the mentioned device also has a problem to completely eliminate the reactionary loadings because of the difference in the weights of the top and bottom platforms, which in turn generate different forces of resistance from their movement. Another problem is caused by the presence of current collectors which considerably reduce the reliability of the hydro power unit. Using a roller on one of platforms whose diameter is equal to the size of the interaction between platforms, leads to the problem that it prevents proper movement between surfaces. It also reduces the reliability of the unit. The presence of rotating traverse forces increases hydro-dynamic and friction losses.

SUMMARY OF THE INVENTION

The present invention is directed to decreasing the hydro resistance and the energy losses in hydro power systems, and increasing the reliability and efficiency thereof.

In particular, the foregoing aims have been achieved by providing an embodiment of the inventive counterbalanced orthogonal hydropower system, preferably having a resultant positive buoyancy, the system comprising: an upper turbine and a lower turbine disposed in horizontal planes with vertical axes of rotation and made in the form of ring-shaped platforms incorporating generator short-circuited rotors, the upper and lower turbines include hydro-dynamically shaped upper and lower blades respectively, so positioned that provide the rotation of the turbines in the opposite directions; a plurality of generator inductors and attachment means therefor disposed, for example, outside of the blades trajectory; support and brake units disposed, for example, inside the blades trajectory; a base means mounted, for example, on the bottom of a water reservoir; a horizontally disposed rigid frame supported by the base means, the frame is preferably made of hollow tubular rods joined in knots, surrounded by a rigid structure shaped as a polygon (e.g. a hexagon) having vertexes, wherein the inductors and the support and brake units are essentially attached to the aforesaid vertexes through spring-loaded hinges.

BRIEF DESCRIPTION OF THE DRAWINGS

Identical reference numerals on the drawings generally refer to the same elements, unless otherwise is stated in the description. A newly introduced numeral in the description is enclosed into parentheses.

DETAILED DESCRIPTION OF THE PREFFERED EMBODIMENTS

Figure 1:
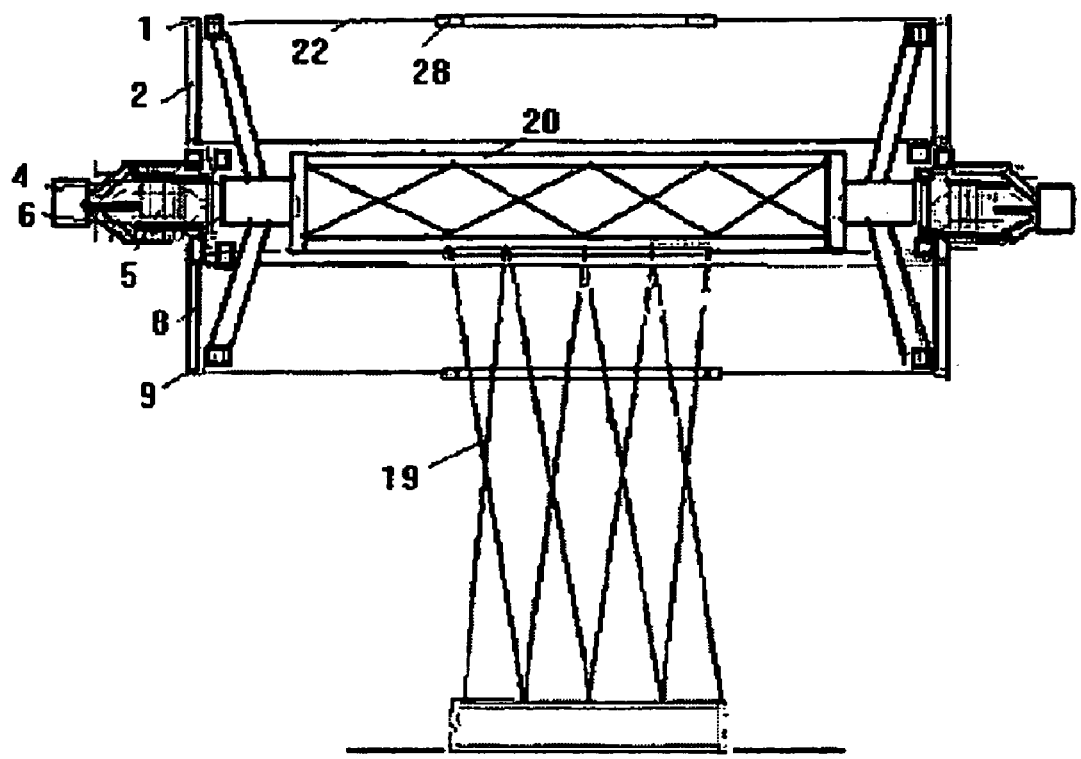
FIG. 1 is a side view of the inventive orthogonal hydro-power system, in accordance with an embodiment of the present invention.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Figure 2A:
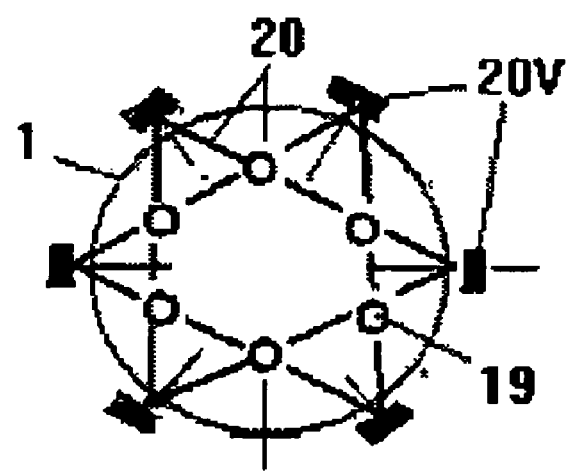
FIG. 2A shows a plan view of the inventive orthogonal hydro-power system, in accordance with an embodiment of the present invention.
Figure 2B:
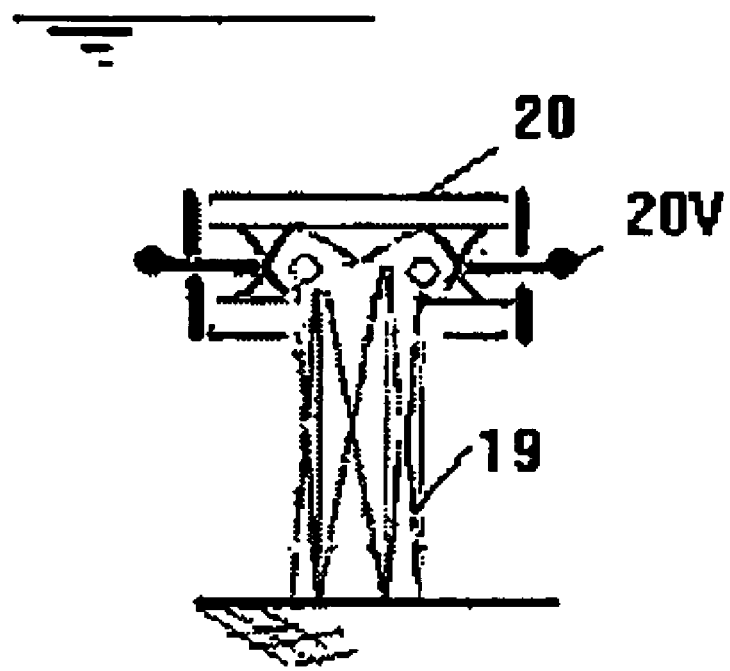
FIG. 2B schematically shows the inventive orthogonal hydro-power system secured to the bottom of a reservoir by means of a tubular tower, in accordance with an embodiment of the present invention.

A preferred embodiment of the inventive orthogonal hydro-power system is illustrated on FIGS. 1, 2A, and 2B. The inventive system comprises a base means, provided in the form of a tower (19), preferably made of a plurality of hollow tubular rods, and mounted essentially on the bottom of a reservoir with flowing water. The inventive system comprises an essentially horizontally disposed rigid frame (20), preferably made of a plurality of hollow tubular rods joined in knots; the frame 20 is peripherally surrounded by a rigid hexagon structure with vertexes (20V) as shown on FIG. 2A. The hexagon structure can be situated externally to the blades 2 and 8 (shown on FIG. 4A) or internally (shown on FIG. 5)

in relation to them. The tower 19 supports the frame 20, and is coupled with the frame 20 in the internal rigidity knots.

Figure 3:
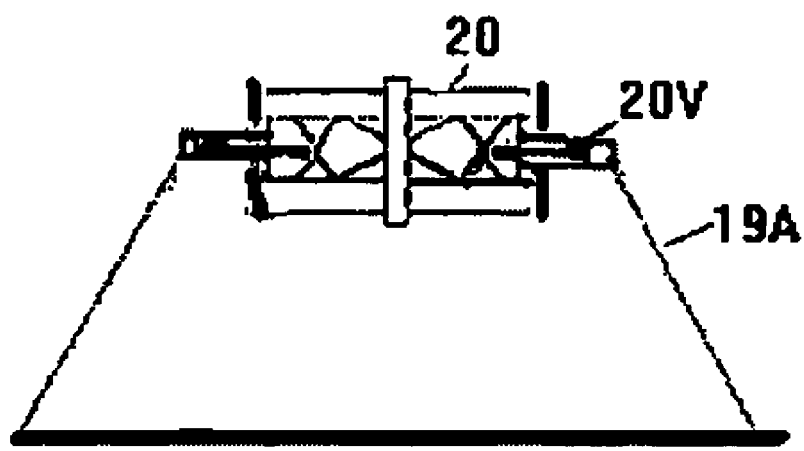
FIG. 3 illustrates the power unit floating and fastened by anchors or trusses to ground pilings, in accordance with the present invention.

An alternative embodiment is schematically illustrated on FIG. 3, wherein the base means is provided in the form of anchors and trusses (19A) mounted on the bottom of a reservoir with flowing water. In other alternative embodiments (not shown) the base means can be provided in the form of a sunken pontoon with positive buoyancy, fixed to the reservoir's bottom with anchors and/or trusses. In such embodiments, the support tower can be used for converting the wave energy into electric power.

In the preferred embodiment depicted on FIG. 1, the inventive system comprises an upper turbine and a lower turbine disposed in horizontal planes and made in the form of ring-shaped platforms. The upper turbine includes a top rim (1), a bottom bearing rim (3), and a plurality of hydro-dynamically shaped upper blades (2) properly mounted to the rims 1 and 3. The lower turbine includes a top bearing rim (7), a bottom rim (9), and a plurality of hydro-dynamically shaped lower blades (8) properly mounted to the rims 7 and 9. The blades 2 and 8 are so positioned that provide the rotation of the turbines in the opposite directions. The blades 2 and 8 can be mounted vertically or be inclined forming a helix line. The rims 3 and 7 are made of a smooth wear-proof material, for instance, steel.

As shown on FIGS. 4A and 5, the rims 1 and 9 are essentially associated with the frame 20 via other elements described below. In preferred embodiments, the inventive system comprises a top centering tension ring (28) coupled with a plurality of top centering strings (22), as illustrated on FIG. 1. Each top centering string 22 is associated with the rim 1 (and a bottom tension ring is analogously associated with the rim 9) through a roller cage mechanism (1R) (and (9R) respectively) providing the rolling of the rims 1 (and of the rim 9) over it. The strings 22 facilitate maintaining the circular shape of the rims.

Figure 7:
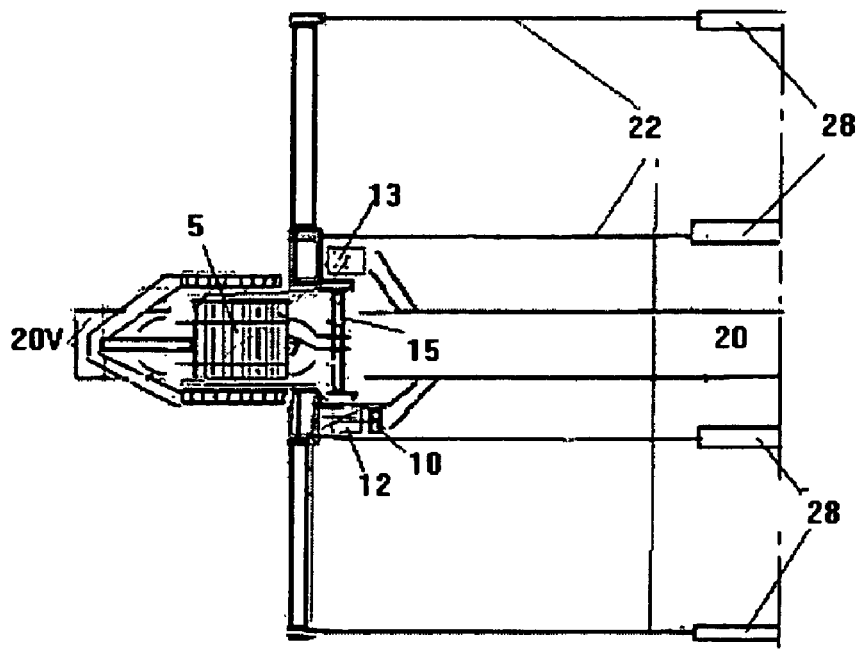
FIG. 7 shows a side view of an embodiment of the inventive orthogonal hydro-power system, incorporating a simplified variant of designing a tension support unit, in accordance with the present invention.

FIG. 7 illustrates an embodiment, where the upper and the lower platforms both have a top centering tension ring 28 and a bottom centering ring 28 joined with the corresponding rims through centering strings 22. In some embodiments, where certain relations of rigidity of the frame, rims, and blades are achieved, the inventive system can be designed without the roller cage mechanisms and the tension rings and centering strings.

In the preferred embodiment depicted on FIG. 1, the inventive system comprises a short-circuited rotor (4) of the upper turbine and a short-circuited rotor (6) of the lower turbine, both made in the form of rings of highly electro-conductive material, such as aluminum or copper. The rotor 4 is essentially coupled with the bearing rim 3, whereas the rotor 6 is essentially coupled with the bearing rim 7. The rotors 4 and 6 constitute secondary portions of an asynchronous electrical generator of the inventive counterbalanced orthogonal hydropower system.

In the preferred embodiment depicted on FIGS. 1 and 4, the inventive system comprises a plurality of electromagnetic inductors (5) and attachment means therefor disposed outside of the blades trajectory, and support units and brake units (described below) disposed inside the blades trajectory. The inductors 5 are attached essentially to the vertexes 20V of the external hexagon (as depicted on FIG. 2A) via support-directing units (as described below), and constitute primary portions of the asynchronous electrical generator of the inventive counterbalanced orthogonal hydropower system.

Figure 5:
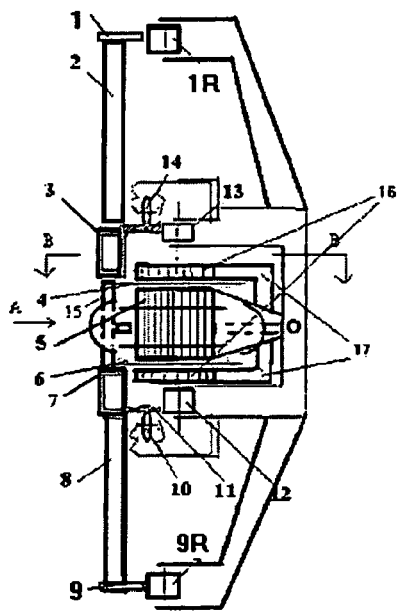
FIG. 5 is a side view of the inventive orthogonal hydro-power system in accordance with another embodiment of the present invention.

Another alternative embodiment is illustrated on FIG. 5, wherein the inductors 5 and their attachment means are disposed inside the blades trajectory, and the support and brake units disposed outside of the blades trajectory.

In preferred embodiments, the inductor 5 comprises a basic magnetic-conductive core, forming a bilateral active zone of magnetic flux, and a common three-phase winding, associated with the core, and forming two magnetic fields running in opposite directions on the different sides of the inductor 5, inverted to the different rotors 4 and 6. The rotational speeds of the magnetic fields are equal for the two active zones and determined by a predetermined distance between the phase coils of the winding and a controllable frequency of the winding's current. The magnetic fields are confined with the help of two stationary electro-isolative magnetic-conductive plates (16) (FIGS. 4A and 5) for each inductor 5, which plates 16 are mounted on fixed supports (17) of a non-magnetic material, preventing the shunting of the magnetic field. The supports 17 provide a predetermined fixed backlash between the magnetic-conductive plate 16 and the basic magnetic core. The magnetic-conductive plates 16 are disposed at the opposite sides of inductor 5, parallel to the rotors 4 and 6.

Figure 6:
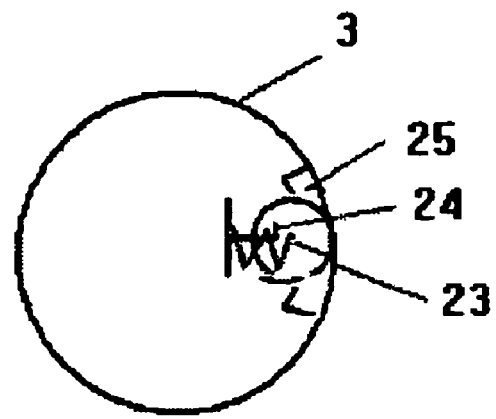
FIG. 6 is a schematic view of an embodiment of the orthogonal hydro-power system, in accordance with the present invention.

The inventive system comprises a number of support-directing means, including consoles that support roller bearings (15) (as shown on FIGS. 4A, 5 and 7) made of a non-magnetic material, whose axes are coaxial with the transverse axes of inductors 5. The consoles are associated with the inductors 5. The free ends of the consoles are spring-loaded with hinges having limiters (as depicted on FIG. 6 and explained below), which hinges limit the vertical movement (conditioned by buoyancy and gravitation forces) of the inductors 5. Thus, the consoles are associated with the frame 20 via the hinges, whose axes extend parallel to the longitudinal axis of the inductor 5. The diameters of the roller bearings 15 precisely correspond to the distance between the rings of the wear-proof material (e.g. the rim 3) and the rings of the conducting material (the rotor 4 respectively), thus maintaining a fixed backlash (FIGS. 4A and 5) between the magnetic —conductive plate 16 and the corresponding rotor. The bearing 15 maintains a constant contact with the rim 3 and the rotor 4. Top turbine has negative buoyancy and bottom turbine has positive buoyancy to fixate the gap between moving short-circuited rotors and immobile inductor.

Alternatively, the roller bearings can be directly affixed to the rotors (not shown). In other alternative embodiments (not shown), the roller bearings can be substituted with ball bearings or sliding bearings, e.g. with a predeterminedly small air clearance, which would perform the same function of maintaining the predetermined backlash between the inductor and rotors.

In preferred embodiment, the inventive system comprises two unloading units (12) and (13) (illustrated on FIGS. 4A, 5 and 7) per each inductor 5, for unloading lateral forces experienced by the bearing rim 7 and bearing rim 3; the units 12 and 13 are mounted on the respective consoles. As shown on FIG. 4-6, the unloading unit is made as a hydro or pneumatic cage, and includes: a limiter (24), chamber (25), and a control roller (23) partially accommodated by the chamber 25. The rollers 23 roll over the rim 3, receive the superfluous lateral loadings of water flow and limit possible movement of the bearing rims. This occurs through pumping an operating fluid (air or liquid) into the chamber 25 absorbing the lateral loadings and unloading the bearing rim. Should the lateral loadings exceed predetermined values, the displacement of the rollers 23 would be restricted by the limiters 24, and the rim would receive the excessive loadings.

Figures 4A, 4B:
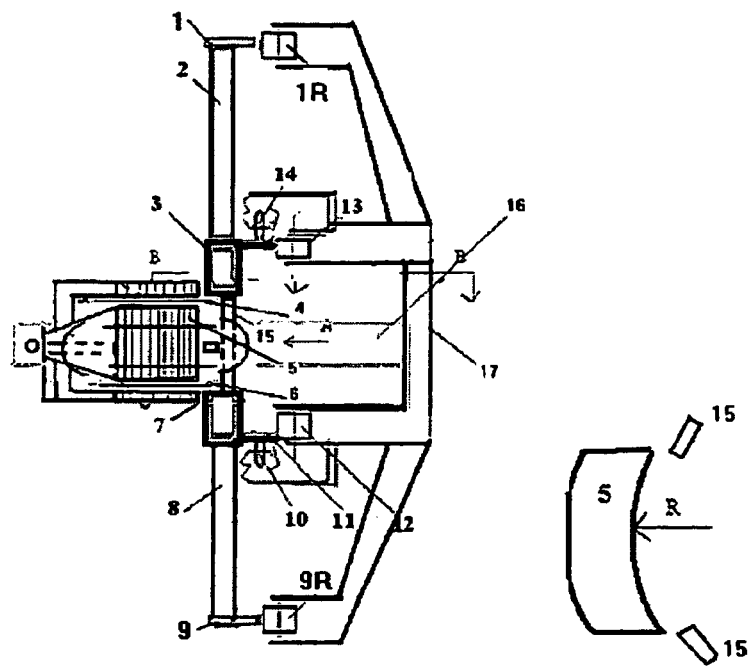
FIG. 4A is a side view of the inventive orthogonal hydro-power system in accordance with an embodiment of the present invention with enlarged partial view FIG. 4B.

In preferred embodiments-illustrated on FIGS. 4A 5 and 7, the inventive system comprises a support-clamping wheel (10), associated with the bearing rim 7, and a support-clamping wheel (14), associated with the bearing rim 3, for compensating vertical forces experienced by the hydropower inventive system. The wheel 10 supports a wear-proof ring (11).

In preferred embodiments (not shown), the inventive system comprises units for pneumatic braking of the turbines provided with a drive from a common unit for delivery of the operating fluid into the roller cages with a valve switching the fluid from the unloading units into the braking units. The units for pneumatic braking are mounted on the consoles, and include a pair of braking pads (not illustrated).

In alternative embodiments, the bearing rims 3 and 7 and the blades 2 and 8 at least partially are made hollow and controllably inflatable so that capable of providing a positive buoyancy of the lower turbine and a negative buoyancy of the upper turbine.

Figure 8:
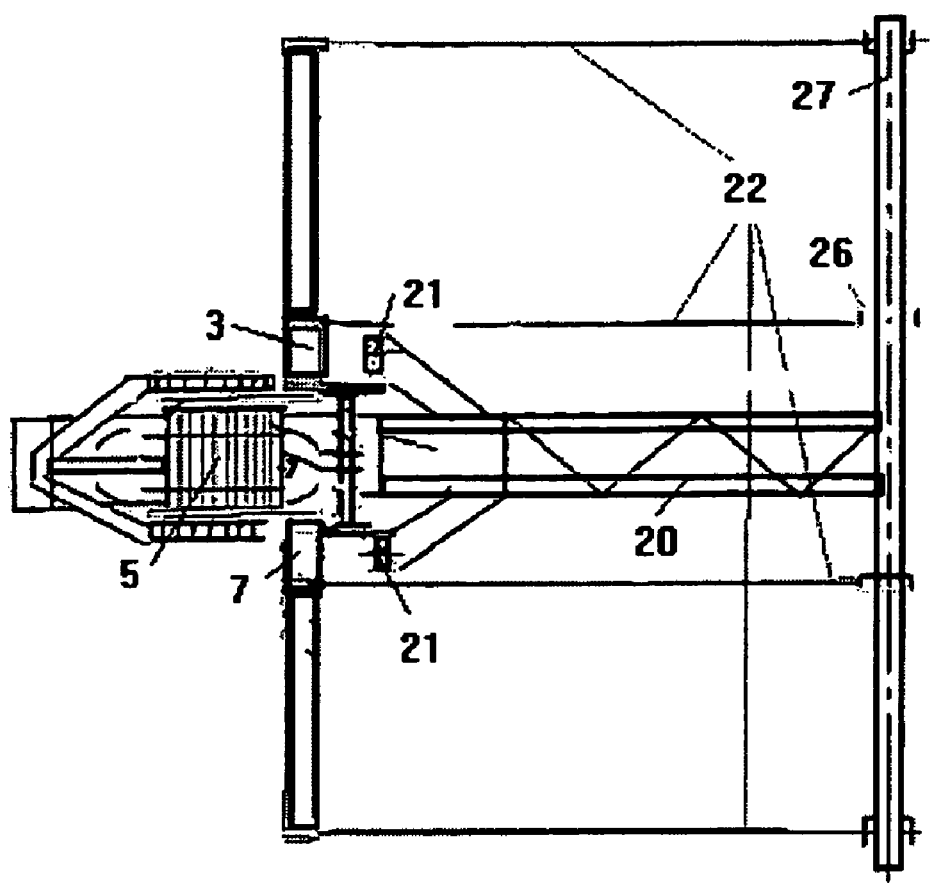
FIG. 8 is a schematic view of a simplified embodiment of the orthogonal hydro-power system, in accordance with the present invention.

In another alternative embodiment, illustrated on FIG. 8, the inventive system comprises the frame 20 supported by a central pylon (27), and the loadings applied to the bearing rims 3 and 7 are transferred to the pylon via traverses (21) and radial bearings (26). The circular shape of the bearing rims is supported by the centering strings 22 associated with the centering rings (not shown on FIG. 8, but shown on FIG. 1). In these embodiments, the top turbine preferably has a negative buoyancy, whereas the bottom turbine and the frame preferably have a positive buoyancy.

I claim:

1. A counterbalanced orthogonal hydropower system comprising:
   an upper turbine disposed in a horizontal plane with a vertical axis of rotation and made in the form of a ring shaped platform including a bottom bearing rim configured as a ring, the platform incorporating a secondary means for generating electrical energy, the upper turbine including hydrodynamically shaped upper blades mounted to the bottom bearing rim, so positioned to produce rotation of the upper turbine in a first direction;
   a lower turbine disposed in a horizontal plane with a vertical axis of rotation and made in the form of a ring shaped platform including a top bearing rim configured as a ring, the lower turbine including hydrodynamically shaped lower blades mounted to the top bearing rim, so positioned to produce rotation of the lower turbine in an opposite direction to the first direction;
   a top centering tension ring coupled with a plurality of top centering strings for support of the ring shape of the bottom bearing rim on the upper turbine;
   a plurality of primary means for generating electric energy;
   a base means substantially associated with the bottom of a water reservoir;
   a horizontally disposed rigid frame supported by said base means, said frame being peripherally surrounded by a rigid structure shaped as a polygon having a plurality of vertexes;
   means for rotatable support of said upper and lower turbines substantially associate with said frame, the means for rotatable support including at least one of a roller bearing, a sliding bearing, and a ball bearing, the means tbr rotatable support maintaining constant contact with the bottom bearing ring shaped rim; and
   means for support of said primary means for generating electric energy;
   wherein the means for support of said primary means for generating electric energy are essentially attached to said vertexes through spring-loaded hinges.

2. The hydropower system according to claim 1, further comprising a bottom centering tension ring coupled with a plurality of bottom centering strings for support of the circular shape of the top bearing rim on the lower turbine.

3. The hydropower system according to claim 1, further comprising means for braking the rotation of said turbines substantially associated with said frame, the means for braking including a valve for switching operating fluid into a braking unit.

4. The hydropower system according to claim 3, wherein the means for braking the rotation of said turbines to produce the electric energy are disposed either inside of the blades trajectory or outside of the blades trajectory.

5. The hydropower system according to claim 1, wherein said frame has positive buoyancy so as to provide for securing of the hydropower system to an anchor.

6. The hydropower system according to claim 1, wherein said frame comprises hollow tubular rods.

7. The hydropower system according to claim 1, further comprising means for unloading said turbines from lateral forces associated with at least one of the top bearing rim and the bottom bearing rim, and means for unloading said turbines from vertical forces associated with the turbines.

8. The hydropower system according to claim 1, wherein said top turbine has negative buoyancy, and said bottom turbine has positive buoyancy.

9. The hydropower system according to claim 1, wherein said primary means for generating electric energy comprises a stationary inductor enclosing two moveable short-circuited rotors.

10. The hydropower system according to claim 9, wherein said top turbine has negative buoyancy, and said bottom turbine has positive buoyancy to maintain a fixed backlash between the rotors and the inductor.

11. The hydropower system according to claim 1, wherein the lower turbine comprises a secondary means for generating electrical energy.

12. The hydropower system according to claim 1, wherein said primary means are disposed either outside of a trajectory followed by the blades or inside of the trajectory followed by the blades.

13. The hydropower system according to claim 1, wherein the means for support of said upper and lower turbines disposed either inside of the blades trajectory or outside of the blades trajectory.

* * * * *